United States Patent
Hoffmann et al.

(10) Patent No.: US 11,353,405 B2
(45) Date of Patent: Jun. 7, 2022

(54) METHOD FOR TREATING INDICATOR FIELDS, INDICATOR FIELD AND TEST DEVICE COMPRISING SUCH AN INDICATOR FIELD

(71) Applicant: AXAGARIUS GmbH & Co. KG, Düren (DE)

(72) Inventors: Jürgen Hoffmann, Düren (DE); Ralph Husmann, Düren (DE); Dominik Lange, Cologne (DE); Christian Prokisch, Düren (DE)

(73) Assignee: AXAGARIUS GmbH & Co. KG, Düren (DE)

( * ) Notice: Subject to any disclaimer, the term of this patent is extended or adjusted under 35 U.S.C. 154(b) by 251 days.

(21) Appl. No.: 16/739,665

(22) Filed: Jan. 10, 2020

(65) Prior Publication Data

US 2020/0225164 A1 Jul. 16, 2020

(30) Foreign Application Priority Data

Jan. 11, 2019 (DE) .......................... 102019100664.3

(51) Int. Cl.
*G01N 21/80* (2006.01)
*G01N 21/78* (2006.01)
*G01N 31/22* (2006.01)
*G01N 21/77* (2006.01)

(52) U.S. Cl.
CPC ............. *G01N 21/80* (2013.01); *G01N 21/78* (2013.01); *G01N 31/221* (2013.01); *G01N 2021/7759* (2013.01)

(58) Field of Classification Search
CPC ................... G01N 21/78; G01N 21/80; G01N 2021/7759; G01N 31/221
USPC ........ 436/163, 164, 166, 169, 174; 422/400, 422/420
See application file for complete search history.

(56) References Cited

U.S. PATENT DOCUMENTS

| | | | | |
|---|---|---|---|---|
| 2,915,373 A * | 12/1959 | Wenker | ................ | G01N 31/221 422/420 |
| 3,145,086 A * | 8/1964 | Free | ................ | C12Q 1/58 435/12 |
| 4,029,597 A * | 6/1977 | Neisius | ................ | C09B 62/45 436/163 |
| 6,413,473 B1 * | 7/2002 | Bacon | ................ | G01N 21/78 422/408 |

(Continued)

FOREIGN PATENT DOCUMENTS

| | | |
|---|---|---|
| DE | 530530 A | 7/1931 |
| DE | 1256445 B | 12/1967 |

(Continued)

*Primary Examiner* — Maureen Wallenhorst
(74) *Attorney, Agent, or Firm* — Berenato & White, LLC

(57) ABSTRACT

A method for treating a plurality of indicator fields for determining the pH-value of an aqueous solution is provided. Each of the indicator fields contains at least one indicator dye, which is fixed in a non-bleeding manner, in particular on a layer including cellulose or regenerated cellulose, and changes its color within a pH-turning-range. The indicator fields having buffer capacities which differ from one another. All the indicator fields are impregnated from the outside with an impregnation which influences the buffer capacities of the indicator fields in such a way that the deviations are levelled.

17 Claims, 1 Drawing Sheet

(56) References Cited

U.S. PATENT DOCUMENTS

| | | | | |
|---|---|---|---|---|
| 6,762,058 B2* | 7/2004 | Takagi | ............... | G01N 33/52 |
| | | | | 436/162 |
| 2009/0275908 A1* | 11/2009 | Song | ............... | A61L 15/56 |
| | | | | 604/361 |
| 2017/0254820 A1* | 9/2017 | Lange | ............... | G01N 21/80 |

FOREIGN PATENT DOCUMENTS

| | | |
|---|---|---|
| DE | 1698247 A1 | 8/1971 |
| DE | 102016203335 A1 | 9/2017 |

* cited by examiner

METHOD FOR TREATING INDICATOR FIELDS, INDICATOR FIELD AND TEST DEVICE COMPRISING SUCH AN INDICATOR FIELD

CROSS-REFERENCE TO RELATED APPLICATIONS AND CLAIM TO PRIORITY

This application is related to application number DE 10 2019 100 664.3, filed Jan. 11, 2019 in the Federal Republic of Germany, the disclosure of which is incorporated herein by reference and to which priority is claimed.

FIELD OF THE INVENTION

The present invention relates to a method for treating a plurality of indicator fields for determining the pH-value of an aqueous solution, the indicator fields each containing at least one indicator dye, which is fixed in a non-bleeding manner, in particular on a layer comprising cellulose or regenerated cellulose, and changes its color within a pH-turning-range, and the indicator fields having buffer capacities which differ from one another. Furthermore, the invention relates to an indicator field treated in this way and a test device comprising such an indicator field.

BACKGROUND OF THE INVENTION

Test devices with indicator fields of the type mentioned above have been known for a long time in the state of the art. They are used for at least semi-quantitative determining of the pH-value of an aqueous solution and are usually offered in the form of test strips. They comprise a plastic carrier on which an indicator field is arranged. The indicator field normally comprises a layer of absorbent paper containing an indicator dye which is fixed in a non-bleeding manner and changes its color within a pH-turning-range.

The non-bleeding fixation of the indicator dye can be achieved by chemically bonding it to the cellulose fibre of the carrier. Suitable methods are described, for example, in the documents DE 1 256 445 and DE 1 698 247, the contents of which are hereby expressly made the content of this description with regard to non-bleeding fixation. The indicator dye itself has acid/base functions and therefore has a certain acid/base strength or buffer capacity. In order to effect a color change or a color turn of the indicator dye when immersing the indicator field in an aqueous solution, the aqueous solution must also have a certain acid/base strength in order to overcome the buffer capacity of the indicator field. If the acid/base strength of the aqueous solution is too low compared to the buffer capacity of the indicator field, the indicator field will display the pH-value of the aqueous solution delayed or no longer reliably. The buffer capacity of the indicator field varies due to production. The reason for this are small fluctuations in the indicator dye quantity or fluctuations in the pH-value of the indicator field material, which are particularly noticeable in indicator fields of different production batches. For a weakly buffered aqueous solution, the correct pH-value can thus still be displayed for an indicator field of a first production batch, while the display deviates using an indicator field from another production batch. It is therefore possible, that indicator fields originating from different production batches discolor differently when immersed in the same aqueous solution and deliver correspondingly different pH-values. This can be avoided to a certain extent by allowing the indicator field to contact the aqueous solution for a longer period of time until color constancy is achieved. Additional washing of the indicator field with water after production is not sufficient to fully compensate production-related fluctuations in buffer capacity.

Based on this prior art it is an object of the present invention to level varying inherent buffer capacities of the indicator fields, in particular varying inherent buffer capacities of indicator fields of different production batches.

SUMMARY OF THE INVENTION

To solve this object, the present invention creates a method for treating a plurality of indicator fields for determining the pH-value of an aqueous solution, the indicator fields each containing at least one indicator dye, which is fixed in a non-bleeding manner, in particular on a layer comprising cellulose or regenerated cellulose, and changes its color within a pH-turning-range, and the indicator fields having buffer capacities which differ from one another, characterized in that all the indicator fields are impregnated from the outside with an impregnation which influences the buffer capacities of the indicator fields in such a way that the deviations are leveled. In other words, impregnation according to the invention adjusts varying inherent buffer capacities of the indicator fields, which in particular are attributable to production-related irregularities that are difficult to remedy themselves, such as unintentional fluctuations in the pH-value of the material used for the indicator fields and/or unintentional fluctuation in the quantities in the indicator dyes used for the respective indicator fields, so that the impregnated indicator fields have an almost uniform buffer capacity. As a result, indicator fields treated according to the invention and immersed in the same aqueous solution show uniform color changes, which significantly improves the reliability and reproducibility of pH-measurements.

According to an embodiment of the present invention, the indicator fields treated with the method according to the invention originate from different production batches. Indicator fields from different production batches often have significantly different buffer capacities, since the materials used for the batches usually also originate from different production batches and are therefore not uniform. Accordingly, a treatment according to the invention of such indicator fields is particularly effective.

Advantageously, the impregnation is a diluted acid, in particular if the pH-turning-range is in the acidic pH-range and/or in the neutral pH-range and/or in the lower alkaline pH-range, preferably a 0.001 molar acid, and/or the impregnation is a diluted lye, in particular when the pH-turning-range is in the medium and/or the upper alkaline pH-range, preferably 0.001 molar lye. Particularly good results where achieved with such diluted acids and lyes.

The indicator fields are preferably each fastened, in particular after their impregnation, for the production of test devices to a carrier, which preferably comprises plastic or consists of plastic, the carrier in particular being strip-shaped.

Furthermore, the present invention creates an indicator field, which contains at least one indicator dye, which is fixed in a non-bleeding manner, in particular on a layer comprising cellulose or regenerated cellulose and changes its color within a pH-turning-range, characterized in that the indicator field is impregnated from the outside with an impregnation which influences its buffer capacity.

The impregnation is preferably a diluted acid, in particular if the pH-turning-range is in the acid pH-range and/or in the neutral pH-range and/or in the lower alkaline pH-range, preferably a 0.001 molar acid.

In particular, if the pH-turning-range is in the medium and/or upper alkaline pH-range, the impregnation is preferably a diluted lye, advantageously a 0.001 molar lye.

Furthermore, the present invention creates a test device having a carrier and at least one indicator field fastened to the carrier and impregnated according to the invention.

Preferably, the carrier comprises plastic or consists of plastic.

According to an embodiment of the present invention, the carrier is strip-shaped and many times longer than the indicator field. Accordingly, the indicator element can be easily grasped by hand and immersed in an aqueous solution.

Further features and advantages of the present invention become clear by the following description of a method according to an embodiment of the present invention for the treatment of test devices or indicator fields for such test devices with reference to the enclosed drawing. In the drawing, it is

DETAILED DESCRIPTION OF THE PREFERRED EMBODIMENT(S)

Test device 1 is used to determine the pH-value of an aqueous solution. It comprises presently a strip-shaped carrier 2 which is made of plastic or consists of plastic. An indicator field 3 is provided on the upper side of the carrier 2 and contains at least one indicator dye which is fixed in a non-bleeding manner, in particular on a layer of the indicator field 3 comprising cellulose or regenerated cellulose. The indicator dye has the property of changing its color within a predetermined pH-turning-range. In other words, a color change occurs when the indicator dye is immersed in an aqueous solution, the pH-value of which is within the pH-turning-range. The indicator dye has an acid/base function and therefore has a certain acid/base strength or buffer capacity. In order to effect said color-change or color-turn of the indicator dye when immersed in an aqueous solution, the aqueous solution must also have a certain acid/base strength in order to overcome this buffer capacity. The buffer capacity should be constant for basically identical indicator fields 3 in order to archive uniform and thus repeatable measurement results with all indicator fields 3. However, this is not the case in practice, since the buffer capacity is subjected to production-related fluctuations, which in particular are due to smallest fluctuations in the indicator dye quantity and/or to fluctuations in the pH-value of the material of indicator field 3. Large fluctuations in buffer capacity can be observed in particular when comparing indicator fields 3, which are basically identical and originate from different production batches, with each other.

Figure 1:
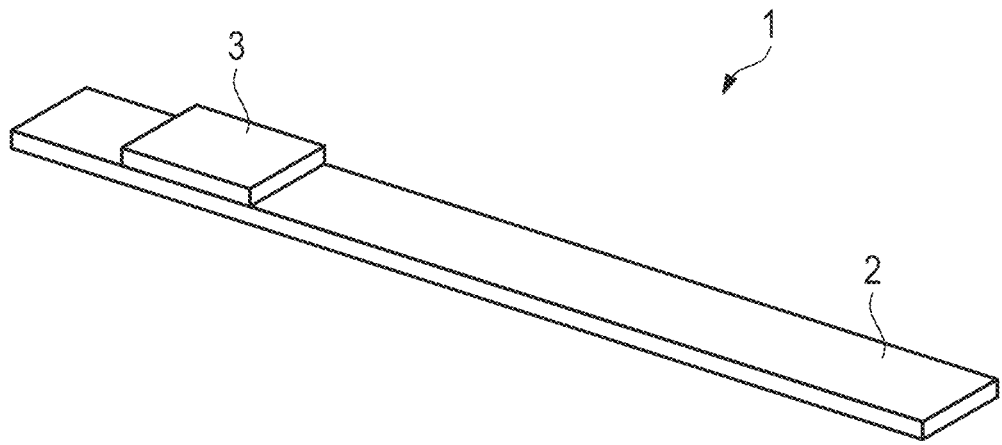
FIG. 1 a perspective schematically view of test device.
Figure 2:
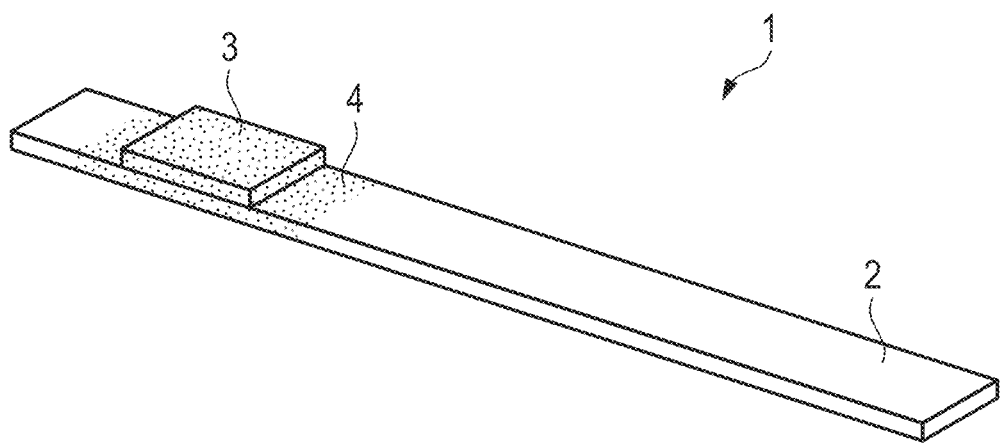
FIG. 2 a perspective schematically view of a test device according to an embodiment of the present invention which results, when an indicator field of the test device shown in FIG. 1 is treated with the method according to an embodiment of the present invention.

Within the framework of experiments, it has now been established that production-related fluctuations in the buffer capacity of indicator fields 3 can be leveled after their production by impregnating indicator fields 3 from the outside with an impregnation 4 that influences the buffer capacity of indicator fields 3, as shown in FIG. 2. Diluted acids, in particular 0.001 molar acids, have proved to be particularly suitable if the pH-turning-range of the indicator dye is in the acid pH-range and/or in the neutral pH-range and/or in the lower alkaline pH-range. Diluted lyes, in particular 0.001 molar lyes, are suitable for impregnation if the pH-turning-range is in the medium and/or upper alkaline pH-range.

In the following, series of experiments will be described which will show the effect of an impregnation according to the invention.

In a first step, a total of a six color-fixed indicator fields 3 were selected, more precisely two indicator fields 3 from the same production batch from each of a group of in total three groups that differ from each other in terms of the pH-turning-range and are subsequently labeled with the indices 3A, 3B and 3C, see table 1. The indicator fields 3A and 3B have a color turning in the pH-range 4.0 to 9.0 and 4.5 to 8.5, respectively. The color turning of the indicator field 3C lies in the alkaline pH-range 7.5 to 9.5.

TABLE 1

| entry | pH-turning-range | color change |
|---|---|---|
| 3A | 4.0-9.0 | orange - blue green |
| 3B | 4.5-8.5 | orange - green blue |
| 3C | 7.5-9.5 | orange - violet |

The listed indicator fields 3A, 3B and 3C were exposed to a gaseous acetic acid and ammonia respectively in a second step. The indicator fields 3A, 3B and 3C exposed to a acetic acid are subsequently marked with index 1, the indicator fields 3A, 3B and 3C exposed to ammonia with index 2. These treatments with acetic acid and ammonia changing the buffer capacities inherent in the indicator fields 3 simulated an acid production batch $3A_1$, $3B_1$ and $3C_1$ and an alkaline production batch $3A_2$, $3B_2$ and $3C_2$ of indicator fields 3. The respective colors of the dry indicator fields $3A_1$, $3A_2$, $3B_1$, $3B_2$, $3C_1$ and $3C_2$ are listed in table 2.

TABLE 2

| entry | $3A_1$ acetic acid (g) | $3A_2$ ammonia (g) | $3B_1$ acetic acid (g) | $3B_2$ ammonia (g) | $3C_1$ acetic acid (g) | $3C_2$ ammonia (g) |
|---|---|---|---|---|---|---|
| dry indicator paper | yellow-orange | turquoise | orange-red | turquoise | yellow | yellow-orange |
| DI-water | yellow-orange | turquoise | red-orange | dark-green | yellow | yellow-orange |
| 0.001M hydrochloric acid | yellow-orange | Orange | orange | green-red | — | — |

TABLE 2-continued

| entry | 3A$_1$ acetic acid (g) | 3A$_2$ ammonia (g) | 3B$_1$ acetic acid (g) | 3B$_2$ ammonia (g) | 3C$_1$ acetic acid (g) | 3C$_2$ ammonia (g) |
|---|---|---|---|---|---|---|
| 0.001M sodium hydroxide | — | — | — | — | yellow-red | red-violet |
| titrisol pH 3 (1:10 dil.) | yellow-orange | green | orange-red | orange-red | — | — |
| titrisol pH 11 (1:10 dil.) | — | — | — | — | red-violet | violet |

In a third step the manipulated indicator fields 3A$_1$, 3A$_2$, 3B$_1$, 3B$_2$, 3C$_1$ and 3C$_2$ where each sealed on a carrier 2 and immersed in defined test solutions. The different colors of the respective indicator fields 3A$_1$, 3A$_2$, 3B$_1$, 3B$_2$, 3C$_1$ and 3C$_2$ are still recognizable. When the indicator fields 3A$_1$ and 3A$_2$ are immersed in weakly buffered solutions such as 0.001 molar hydrochloric acid or a 1:10 diluted Titrisol pH 3 solution, different colors can also be recognized, namely yellow-orange and orange or yellow-orange and green. After immersion in weakly buffered solutions such as 0.001 molar hydrochloric acid, the indicator fields 3B$_1$ and 3B$_2$ show an orange or green-red color reaction. After immersion in 1:10 diluted titrisol pH 3 solution, an orange-red color reaction can be observed in both indicator fields 3B$_1$ and 3B$_2$. After immersion in weakly buffered solutions such as 0.001 molar sodium hydroxide solution or 1:10 diluted titrisol pH 11 solution, the indicator fields 3C$_1$ and 3C$_2$ show different colors, namely yellow-red and red-violet or red-violet and violet respectively.

To level the buffer capacities inherent in the indicator fields 3A$_1$, 3A$_2$, 3B$_1$, 3B$_2$, 3C$_1$ and 3C$_2$, they were treated as follows according to an embodiment of the present invention:

The indicator fields 3A$_1$, 3A$_2$, 3B$_1$, 3B$_2$, 3C$_1$ and 3C$_2$ manipulated with gaseous acetic acid and gaseous ammonia where provided with an impregnation 4, see FIG. 2. For the indicator fields 3A$_1$, 3A$_2$, 3B$_1$ and 3B$_2$ diluted acid was used as impregnation, presently 0.001 molar acid. As impregnation 4 for the indicator elements 1C$_1$ and 1C$_2$, however, diluted lye was used, presently a 0.001 molar diluted lye.

The successful leveling of the buffer capacities of the impregnated indicator fields 3A$_1$, 3A$_2$, 3B$_1$, 3B$_2$, 3C$_1$ and 3C$_2$ is shown in table 3 in a similar to the same color reaction when the impregnated indicator fields 3A$_1$, 3A$_2$, 3B$_1$, 3B$_2$, 3C$_1$ and 3C$_2$ are immersed in the weakly buffered test solutions indicated there, which correspond to the test solutions according to table 2.

As a result, the reimpregnation of indicator fields 3 according to the invention achieve leveling of production-related fluctuations of the buffer capacities inherent in indicator fields 3, which leads to constant or at least approximately constant measurement results across production batches. In this way, the reliability of pH-measurements can be significantly increased.

At this point, it should be noted that indicator fields 3 are preferably provided with the impregnation 4 during the production of indicator fields 3, i.e. before the indicator fields are attached to a carrier 2 to produce a test device 1.

We claim:

1. A method for treating a plurality of indicator fields for determining pH value of an aqueous solution, the method comprising the steps of:
   a) providing the plurality of indicator fields having differing buffer capacities from each other, each indicator field includes at least one indicator dye fixed on a substrate, the dye capable of changing its color within a pH turning range; and
   b) applying an agent to each indicator field, wherein the agent is applied at a concentration which equalizes the differing buffer capacities of the indicator fields.

2. The method of claim 1, wherein the indicator fields originate from different production batches.

3. The method of claim 1, wherein the agent is an acid or a base.

4. The method of claim 3, wherein the acid or the base has a concentration of 0.001 molar.

5. The method of claim 4, wherein the base is lye.

6. The method of claim 1, further comprising the step of fastening the indicator fields to a carrier after applying the agent to each indicator field.

7. The method of claim 6, wherein the carrier comprises plastic.

8. The method of claim 7, wherein the carrier is strip-shaped and longer than the indicator fields.

TABLE 3

| entry | 3A$_1$ acetic acid (g) | 3A$_2$ ammonia (g) | 3B$_1$ acetic acid (g) | 3B$_2$ ammonia (g) | 3C$_1$ acetic acid (g) | 3C$_2$ ammonia (g) |
|---|---|---|---|---|---|---|
| dry indicator paper | yellow-orange | green | orange-red | green | yellow-orange | light red |
| DI-water | yellow-orange | green | red-orange | dark-green | yellow-orange | red |
| 0.001M hydrochloric acid | yellow-orange | yellow-orange | orange-red | orange-red | — | — |
| 0.001M sodium hydroxide | — | — | — | — | red-violet | violet |
| titrisol pH 3 (1:10 dil.) | yellow-orange | yellow-orange | orange-red | orange-red | — | — |
| titrisol pH 11 (1:10 dil.) | — | — | — | — | violet | violet |

9. The method of claim 1, wherein the substrate comprises cellulose or regenerated cellulose.

10. An indicator field comprising
   a) a plurality of indicator dyes, each fixed in a non-bleeding manner on a substrate, wherein the plurality of indicator dyes change color within a pH-turning range and the plurality of indicator dyes have differing buffer capacities from each other; and
   b) an agent applied to each of the indicator dyes, wherein the agent is applied at a concentration which equalizes the differing buffer capacities of the indicator dyes.

11. The indicator field of claim 10, wherein the substrate comprises cellulose or a regenerated cellulose.

12. The indicator field of claim 10, wherein the agent is an acid or a base.

13. The indicator field of claim 12, wherein the acid or base has a concentration of 0.001 molar.

14. The indicator field of claim 13, wherein the base is lye.

15. A test device comprising a carrier and the indicator field of claim 10 fastened to the carrier.

16. The test device of claim 15, wherein the carrier comprises plastic.

17. The test device of claim 15, wherein the carrier is strip-shaped and longer than the indicator field.

\* \* \* \* \*